United States Patent
Abdallah et al.

(10) Patent No.: US 12,360,278 B2
(45) Date of Patent: Jul. 15, 2025

(54) QUANTIFICATION OF FORMATION WATER SATURATION AND SALINITY USING RELATIVE PERMITTIVITY AND CONDUCTIVITY MEASUREMENTS

(71) Applicants: Schlumberger Technology Corporation, Sugar Land, TX (US); Saudi Arabian Oil Company, Dhahran (SA)

(72) Inventors: Wael Abdallah, Dhahran (SA); Ping Zhang, Albany, CA (US); Shouxiang Ma, Dhahran (SA); Chengbing Liu, Al-Khobar (SA)

(73) Assignees: SCHLUMBERGER TECHNOLOGY CORPORATION, Sugar Land, TX (US); SAUDI ARABIAN OIL COMPANY, Dhahran (SA)

( * ) Notice: Subject to any disclaimer, the term of this patent is extended or adjusted under 35 U.S.C. 154(b) by 447 days.

(21) Appl. No.: 17/905,080

(22) PCT Filed: Feb. 28, 2020

(86) PCT No.: PCT/US2020/020339
§ 371 (c)(1),
(2) Date: Aug. 26, 2022

(87) PCT Pub. No.: WO2021/173150
PCT Pub. Date: Sep. 2, 2021

(65) Prior Publication Data
US 2023/0109189 A1    Apr. 6, 2023

(51) Int. Cl.
*G01V 3/28* (2006.01)
*E21B 49/00* (2006.01)

(52) U.S. Cl.
CPC .............. *G01V 3/28* (2013.01); *E21B 49/00* (2013.01); *E21B 2200/20* (2020.05)

(58) Field of Classification Search
CPC .. G01V 3/28; G01V 3/38; E21B 49/00; E21B 2200/20
See application file for complete search history.

(56) References Cited

U.S. PATENT DOCUMENTS

| | | |
|---|---|---|
| 4,786,873 A | 11/1988 | Sherman |
| 7,363,160 B2 | 4/2008 | Seleznev et al. |

(Continued)

FOREIGN PATENT DOCUMENTS

WO    2018183223 A1    10/2018

OTHER PUBLICATIONS

Substantive Exam issued in Saudi Arabia Patent Application No. 522440342 dated May 28, 2023, 24 pages with English translation.

(Continued)

*Primary Examiner* — Ricky Go
(74) *Attorney, Agent, or Firm* — Michael L. Flynn

(57) ABSTRACT

Method and systems are provided that characterize a geological formation, which involve collecting or obtaining electrical signal data that results from interaction of electrical signals with the formation. The electrical signal data is processed to determine data characterizing relative permittivity and conductivity of the formation. The data characterizing relative permittivity and conductivity of the formation are used as inputs to models to determine data characterizing water saturation of the formation, particularly useful in formation evaluation and reservoir saturation dynamic monitoring in fresh water and mixed salinity environments.

20 Claims, 8 Drawing Sheets

(56) References Cited

U.S. PATENT DOCUMENTS

| | | | |
|---|---|---|---|
| 10,036,826 B2 | 7/2018 | Thiel et al. | |
| 11,119,239 B2* | 9/2021 | Kouchmeshky | G01V 3/30 |
| 2010/0078165 A1* | 4/2010 | Seleznev | E21B 49/00 |
| | | | 166/66 |
| 2014/0320126 A1* | 10/2014 | Heaton | G01V 11/00 |
| | | | 324/303 |
| 2016/0245952 A1* | 8/2016 | Dupuis | G01V 3/38 |
| 2017/0276832 A1* | 9/2017 | Kouchmeshky | E21B 49/00 |
| 2018/0164466 A1 | 6/2018 | Zhang | |
| 2019/0204466 A1* | 7/2019 | Zhang | G01V 3/30 |
| 2019/0265382 A1 | 8/2019 | Itskovich et al. | |

OTHER PUBLICATIONS

International Preliminary Report on Patentability issued in PCT Application PCT/US2020/020339 dated Sep. 9, 2022, 9 pages.

Misra et al., 2016a. "Interfacial polarization of disseminated conductive minerals in absence of redox-active species—Part 1: Mechanistic model and validation." Geophysics 81 (2): E139-E157.

Misra et al., 2016b. "Interfacial polarization of disseminated conductive minerals in absence of redox-active species—Part 2: Effective electrical conductivity and dielectric permittivity Interfacial polarization due to inclusions." Geophysics 81 (2): E159-E176.

International Search Report and Written Opinion issued in PCT Application PCT/US2020/020339, dated Nov. 11, 2020 (12 pages).

Han et al., Hydrocarbon saturation in a Lower-Paleozoic organic-rich shale gas formation based on Markov-chain Monte Carlo stochastic inversion of broadband and electromagnetic dispersion logs, Fuel. May 1, 2019, vol. 234, No. 1, pp. 645-658.

Second Substantive Exam issued in Saudi Arabia Patent Application No. 522440342 dated Nov. 12, 2023, 9 pages with English translation.

* cited by examiner

QUANTIFICATION OF FORMATION WATER SATURATION AND SALINITY USING RELATIVE PERMITTIVITY AND CONDUCTIVITY MEASUREMENTS

FIELD

The present disclosure relates to the field of well logging to determine characteristics of formations surrounding an earth borehole and, more particularly, to methods for determining earth formation characteristics using dielectric permittivity and conductivity measurements.

BACKGROUND

The determination of formation water saturation ($S_w$) is a challenging petrophysical calculation and it is used to quantify information useful for reservoir evaluation and analysis, such as formation hydrocarbon saturation ($1-S_w$) and then volume of original oil in place (i.e., stock-tank original oil in place) and/or volume of original gas in place (i.e., stock-tank original gas in place).

Resistivity logs have traditionally been used to estimate formation water saturation for reservoir evaluation and analysis. There are also applications of using high frequency permittivity tools for estimation of formation water saturation. Among them the following patents are relevant: U.S. Pat. No. 4,786,873, to Sherman entitled "Method for Evaluating Water Saturation in Petroleum Reservoirs from Dielectric Permittivity" and U.S. Pat. No. 7,363,160 to Seleznev at al. entitled "Technique for Determining Properties of Earth Formations Using Dielectric Permittivity Measurements."

In these applications, formation water saturation is based on Archie's model or equation as follows:

$$S_w^n = \frac{R_w}{R_T} \frac{1}{\phi^m}, \quad \text{Eqn. (1)}$$

where $S_w$ is formation water saturation, $R_w$ is formation water resistivity which is a function of water salinity and measurement temperature, $R_T$ is true formation resistivity, $\phi$ is formation porosity, and m and n are formation rock electrical properties usually determined in laboratory core analysis.

The underlying assumption of using Archie's model of Eqn. (1) is that the formation water has lower resistivity than the hydrocarbons (oil and/or gas) of the formation. However, in a fresh-water environment, the formation water can have a higher resistivity, closer to that of hydrocarbons (oil and/or gas) of the formation. In this case, the Archie's equation is not capable to differentiate water from hydrocarbon, thus estimating water saturation using Archie's equation is not possible in such environments. In addition, since formation water salinity or resistivity is a direct input to the Archie's equation, formation water saturation calculated from Archie's equation can carry very large uncertainties in unknown mixed formation water salinity environments.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Method and systems are provided that characterize a geological formation, which involve collecting or obtaining electrical signal data that results from interaction of electrical signals with the formation. The electrical signal data is processed to determine data characterizing relative permittivity of the formation. The data characterizing relative permittivity of the formation is used as an input to at least one model to determine data characterizing water saturation of the formation.

In embodiments, the at least one model is based on a first equation and second equation, wherein the first equation relates a parameter representing relative permittivity of the formation to a parameter representing water volume of the formation, and wherein the second equation relates the parameter representing water volume of the formation and formation porosity to a parameter representing permittivity-based water saturation of the formation.

In one embodiment, the first equation is of the form
$V_w = A\varepsilon_r B$, where $\varepsilon_r$ is the parameter representing relative permittivity of the formation, $V_w$ is the parameter representing water volume of the formation, and A and B are calibration constants.

In another embodiment, the first equation is of the form $V_w^2 + aV_w = b\varepsilon_r + c$, where $\varepsilon_r$ is the parameter representing relative permittivity of the formation, $V_w$ is the parameter representing water volume of the formation, and a, b, and c are calibration constants.

In one embodiment, the second equation is of the form where $$S_w(\varepsilon_r) = \frac{V_w}{\phi},$$

$S_W(\varepsilon_r)$ is the parameter representing permittivity-based water saturation of the formation, $V_w$ is the parameter representing water volume of the formation, and $\phi$ is formation porosity.

In embodiments, the parameter representing permittivity-based water saturation of the formation can be used to generate the data characterizing water saturation of the formation. For example, in a freshwater environment, the parameter representing permittivity-based water saturation of the formation can be equated to the data characterizing water saturation of the formation or given weight in generating the data characterizing water saturation of the formation.

In embodiments, the at least one model can further include at least one additional equation that relates formation resistivity or conductivity to a parameter representing resistivity-based water saturation of the formation resistivity.

In embodiments, the parameter representing permittivity-based water saturation of the formation and the parameter representing resistivity-based water saturation of the formation can be combined or reconciled to generate the data characterizing water saturation of the formation. For example, in a high salinity environment, the data characterizing water saturation of the formation can be equated to the parameter representing resistivity-based water saturation of the formation, or more weight can be given to the parameter representing resistivity-based water saturation of the formation relative to the parameter representing permittivity-based water saturation of the formation in generating the data characterizing water saturation of the formation. In another example, in a freshwater (low salinity) or unknown or mixed salinity environment, the data characterizing water saturation of the formation can be equated to the parameter representing permittivity-based water saturation of the formation, or more weight is given to the parameter representing permittivity-based water saturation of the formation relative to the parameter representing resistance-based water saturation of the formation in generating the data characterizing water saturation of the formation.

In one embodiment, the at least one additional equation is of the form $$S_w^n = \frac{R_w}{R_T} \frac{1}{\phi^m},$$

where $S_w$ is resistivity-based water saturation of the formation, $R_w$ is formation water resistivity which is a function of water salinity and measurement temperature, $R_T$ is true formation resistivity, $\phi$ is formation porosity, and m and n are formation rock electrical properties.

In embodiments, the processing of the electrical signal data to determine data characterizing relative permittivity of the formation can involve an inversion process, such as a pixel-based inversion process.

In embodiments, the electrical signal data can include in-phase signal component data and out-of-phase signal component data acquired by an induction logging tool. For example, the in-phase signal component data and out-of-phase signal component data are acquired at a lower frequency within the range of a few hundred KHz to a few MHz.

In other embodiments, the electrical signal data can include attenuation signal component data and phase-shift signal component data acquired by a propagation logging tool at frequency within the range of a few hundred KHz to a few MHz.

In embodiments, the methods and systems further involve the operation of a downhole logging tool to acquire the electrical signal data of a) at a depth of investigation of at least 2 ft to 10 ft into the formation from the borehole wall.

In embodiments, the operations of the methods and systems can be performed by a processor.

In embodiments, the data characterizing water saturation of the formation is used for reservoir saturation monitoring (such as identifying by-passed hydrocarbon, monitoring water-hydrocarbon contact movement, and evaluating sweep efficiency by invading water through such as water-flooding in fresh water or mixed salinity environments).

In embodiments, the operations of the methods and systems can be repeated for electrical signal data measured at different depths and different azimuth directions in a wellbore in order to investigate different parts of the formation that is traversed by the wellbore.

In another aspect, methods and systems are provided for drilling a wellbore that traverses a formation using a drill bit, which involve collecting or obtaining electrical signal data that results from interaction of electrical signals with the formation. The electrical signal data is processed to determine data characterizing relative permittivity of the formation. The data characterizing relative permittivity of the formation is used as an input to at least one model to determine data characterizing water saturation of the formation. These operations are repeated for electrical signal data measured at different depths and different azimuth directions in the wellbore in order to investigate different parts of the formation that is traversed by the wellbore. The drill bit is steered to adjust and control trajectory of the drilled wellbore based on the data characterizing water saturation of the different parts of the formation.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

Figure 1A:
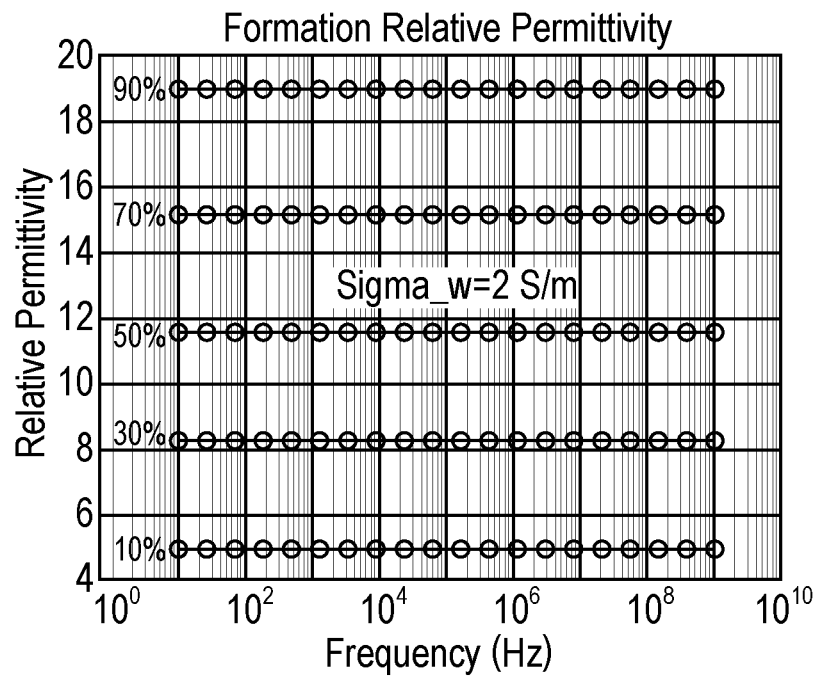
FIG. 1A depicts plots of relative dielectric permittivity as a function of frequency and water saturation (10%, 30%, 50%, 70%, 90%) calculated for a low water conductivity (i.e., fresher water, Sigma_w) of 2 S/m.

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Dielectric permittivity can be estimated from electromagnetic measurements, such as wireline induction logs and/or propagation logging while drilling tools. Water has a high dielectric permittivity in comparison with other common materials commonly encountered in subsurface, because it can store charges in the dipole-dipole associated with the O—H covalent bond. The relative dielectric permittivity ($\varepsilon r$) of the different materials of an earth formation vary widely (for example, 2.2 for oil, 7.5 for limestone, and 80 for water). This strong contrast between water and other materials provides an opportunity for using dielectric permittivity to estimate formation water saturation.

In a subsurface reservoir environment, dielectric permittivity is mainly caused by interfacial polarization (IP). This effect is widely observed from electromagnetic (EM) surveys conducted on porous media. The commonly measured downhole EM measurements have components that are also impacted by IP effects; thus, they can be used to estimate dielectric permittivity. More specifically, in a reservoir formation containing porous media (reservoir rock) and formation fluids (water, oil, and/or gas), application of an external electric field results in electric conduction (migration of charge carries) and interfacial polarization (IP). The conduction current and IP effects can be characterized by formation conductivity and dielectric permittivity, which are best described by a complex conductivity:

$$\sigma = \sigma^R + i2\pi f \varepsilon_r \varepsilon_0, \quad \text{Eqn. (2)}$$

where $\sigma^R$ is effective formation conductivity, $\varepsilon_r$ relative dielectric permittivity, $\varepsilon_0$ the permittivity of vacuum ($8.854 \times 10^{-12}$) and f measurement frequency.

A pixel inversion-based processing method can be used to simultaneous determine the conductivity $\sigma^R$ (or resistivity) and relative dielectric permittivity $\varepsilon_r$ of the formation, by measured R- and X- components of resistivity logs obtained from induction-type logging tools as well as phase shift and attenuation data from Logging While Drilling (LWD) tools. An example of pixel inversion-based processing method is described in detail in U.S. Pat. No. 10,036,826, commonly assigned to assignee of the subject disclosure. In this example pixel inversion-based processing method, there is no assumption as to a maximal number of layers (an assumption usually present in model-based inversion approaches). Furthermore, instead of inverting for distance to boundaries layer thicknesses, bed resistivities, and dip, the example pixel inversion-based processing method inverts for distribution of resistivities using predefined thin layers referred to as "pixels." The boundary positions are inferred from changes in resistivities.

In other embodiments, model-based inversion processing methodology can be used. The inversion process can employ a model based on Maxwell's equations to solve for the data characterizing resistivity (or conductivity) and complex permittivity (or dielectric constant) of the formation. The stopping criteria for the inversion process can also be based on cost function. The cost function may include one or more parameters related to physical properties of the formation, such as resistivity (or conductivity), permittivity (or dielectric constant), and position within the formation. For example, the cost function may include a misfit term, an entropy term, and a smoothing term. In some embodiments, one or more of the terms (e.g., the misfit term, the entropy term, and the smoothing term) may be parameterized based on the resistivity (or conductivity) and/or permittivity (or dielectric constant) as defined by the model.

Through model simulations, it is found that the dielectric permittivity has strong dependence on porosity and water saturation and little dependence on water salinity. Furthermore, the dielectric permittivity has almost a linear relationship with the volume of water, i.e., the product of porosity and saturation, which makes it possible to estimate water saturation using dielectric permittivity.

Figure 1B:
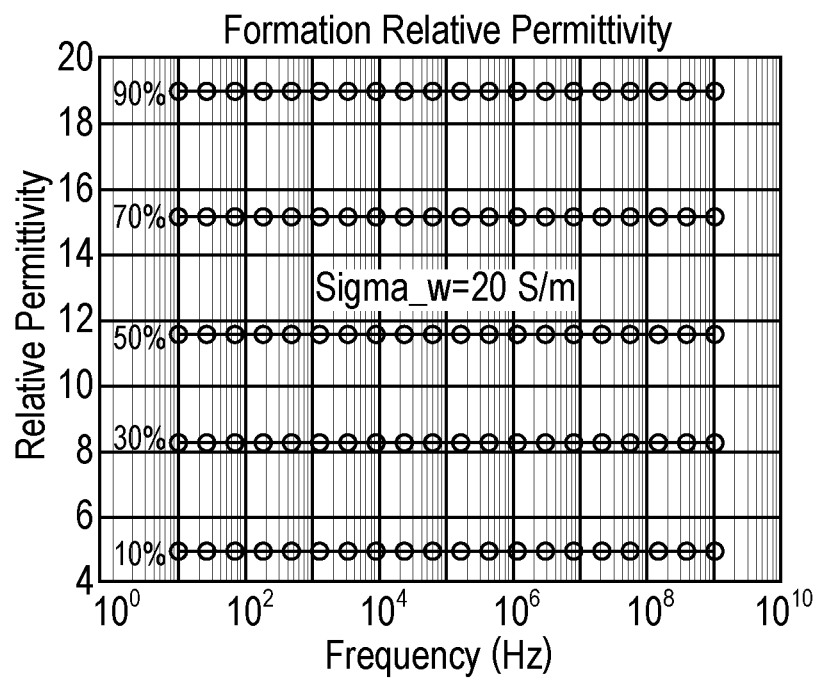
FIG. 1B depicts plots of relative dielectric permittivity as a function of frequency and water saturation (10%, 30%, 50%, 70%, 90%) calculated for a high-water conductivity (i.e., saline water, Sigma_w) of 20 S/m.

FIGS. 1A and 1B show simulated relative dielectric permittivity as a function of frequency and water saturation for a reservoir formation containing both water and hydrocarbon. The difference between the two figures is water salinity. FIG. 1A depicts plots of relative dielectric permittivity as a function of frequency and water saturation (10%, 30%, 50%, 70%, 90%) calculated for a water conductivity (Sigma_w) of 2 S/m (a salinity of 5 kppm, i.e., fresh water). FIG. 1B depicts plots of relative dielectric permittivity as a function of frequency and water saturation (10%, 30%, 50%, 70%, 90%) calculated for a water conductivity (Sigma_w) of 20 S/m (a salinity of 150 kppm, i.e., saline water). It is observed that the dielectric permittivity has little dependence on frequency and water salinity but is very sensitive to water saturation.

Figure 2A:
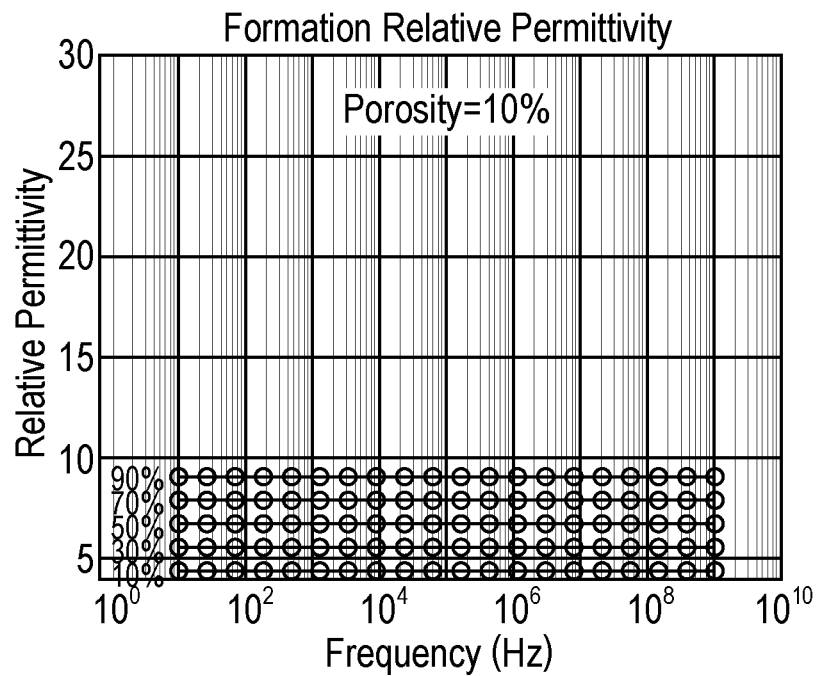
FIG. 2A depicts plots of relative dielectric permittivity as a function of frequency and water saturation (10%, 30%, 50%, 70%, 90%) calculated for a low porosity system of 10%.
Figure 2B:
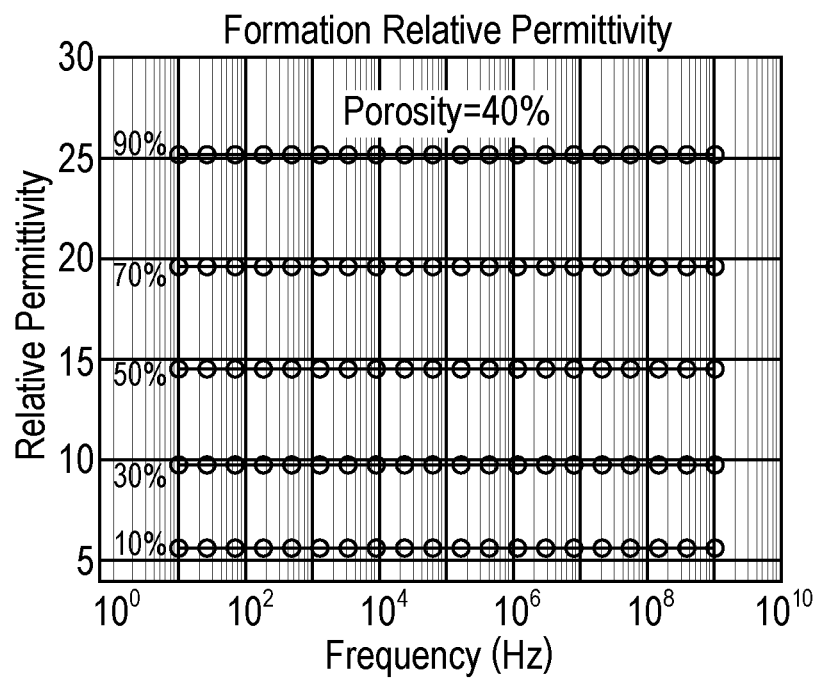
FIG. 2B depicts plots of relative dielectric permittivity as a function of frequency and water saturation (10%, 30%, 50%, 70%, 90%) calculated for a high porosity system of 40%.

FIGS. 2A and 2B show simulated relative dielectric permittivity as a function of frequency and water saturation for a reservoir formation containing both water and hydrocarbon. FIG. 2A depicts plots of relative dielectric permittivity as a function of frequency and water saturation (10%, 30%, 50%, 70%, 90%) calculated for a low porosity system of 10%. FIG. 2B depicts plots of relative dielectric permittivity as a function of frequency and water saturation (10%, 30%, 50%, 70%, 90%) calculated for a high porosity system of 40%. The plots clearly demonstrate that the relative dielectric permittivity depends on both water saturation ($S_w$) and porosity ($\phi$), and intuitively, the combination of $S_w$ and $\phi$, such as water volume, $V_w$ which is given as:

$$V_w = S_w \phi. \quad \text{Eqn. (3)}$$

Figure 3:
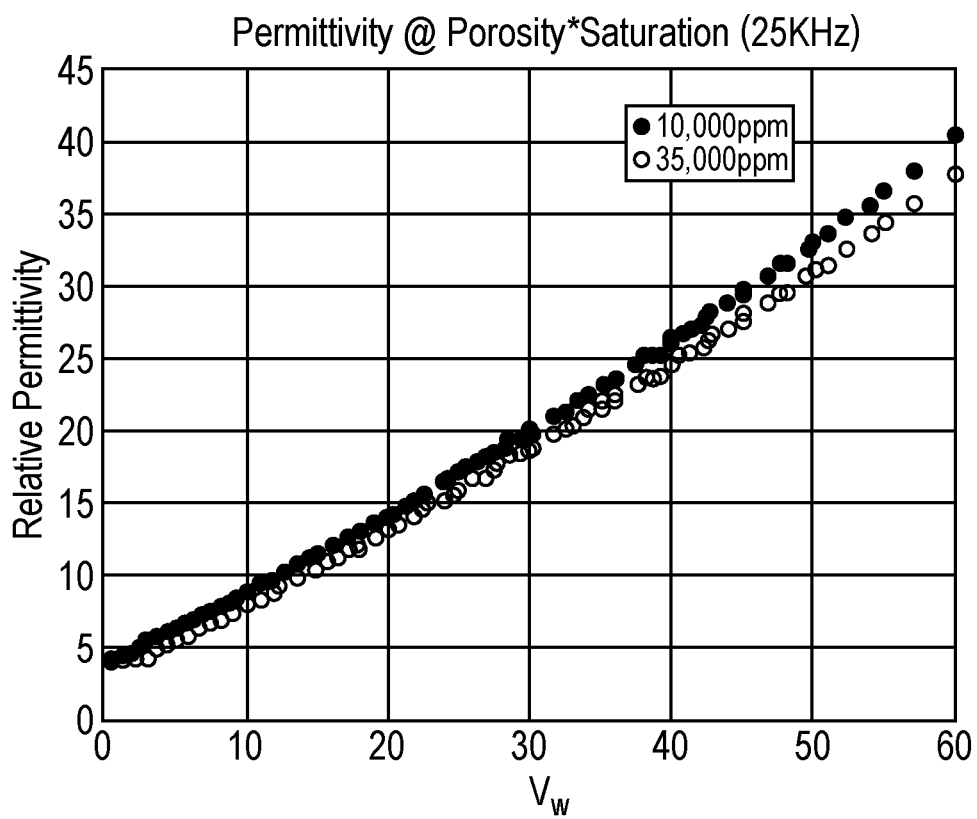
FIG. 3 depicts cross plots between dielectric permittivity εr with water volume $V_w$ for two salinities (10 and 35 kppm) at 25 KHz, which is the frequency typically used in conventional induction logging tools.

FIG. 3 shows cross plots of dielectric permittivity $\varepsilon_r$ with water volume $V_w$ for two salinities: 10 kppm and 35 kppm. It shows that the relative dielectric permittivity $\varepsilon_r$ only weakly depends on the salinity. Thus, for a known salinity, say 10 kppm, correlations between relative dielectric permittivity $\varepsilon_r$ and $V_2$ can be computed using linear and non-linear regression methods as shown in FIGS. 4A and 4B.

Figure 4A:
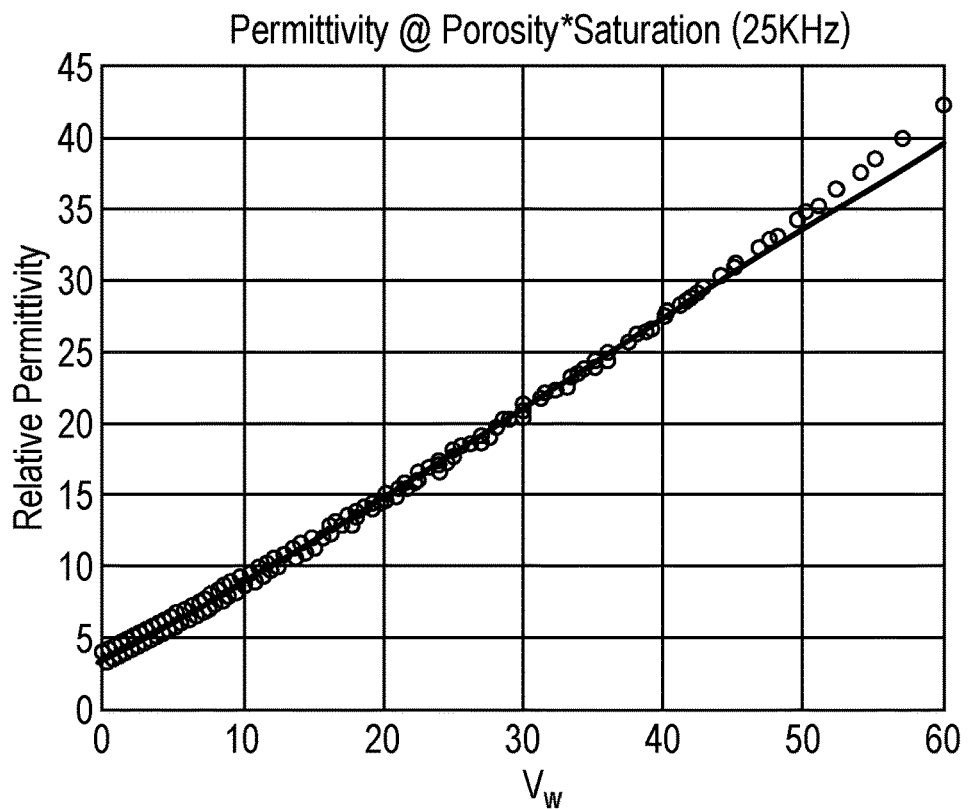
FIG. 4A is a plot of linear regression analysis that quantifies water volume ($V_w$) from 25 KHz relative permittivity (εr) measurements.
Figure 4B:
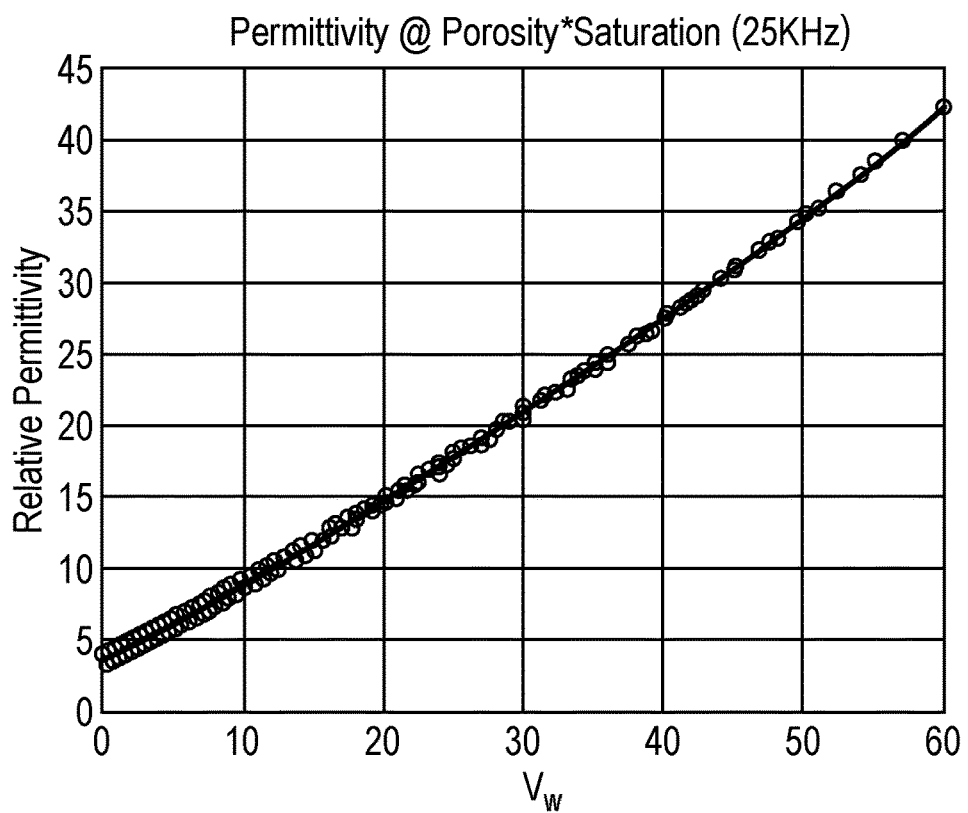
FIG. 4B is a plot of non-linear regression analysis that quantifies water volume ($V_w$) from 25 KHz relative permittivity (εr) measurements.

Specifically, FIG. 4A shows a linear regression result (black line) which gives the following formula:

$$V_w = A\varepsilon_r + B, \quad \text{Eqn. (4a)}$$

where A and B are calibration constants, which can be determined from linear regression analysis on laboratory measurements of core samples or other suitable measurements.

Specifically, FIG. 4A quantifies water volume ($V_w$) from 25 KHz relative permittivity ($\varepsilon r$) measurements obtained from linear regression. The dots are the raw data obtained from simulation while black lines are relationships obtained from linear regressions.

FIG. 4B shows a non-linear regression result (black line) which gives a different formula:

$$V_w^2 + aV_w = b\varepsilon_r + C. \quad \text{Eqn. (4b)}$$

where a, b, and c are calibration constants, which can be determined from non-linear regression analysis on laboratory measurements of core samples or other suitable measurements.

Specifically, FIG. 4B quantifies water volume ($V_w$) from 25 KHz relative permittivity ($\varepsilon r$) measurements obtained from non-linear regression. The dots are the raw data obtained from simulation while black lines are relationships obtained from non-linear regressions.

Equations 4a and 4b allow the determination of $V_w$ from the relative dielectric permittivity $\varepsilon_r$. With independently determined formation porosity ($\phi$), a permittivity-based water saturation, $S_w(\varepsilon_r)$, can then be calculated based on the definition of $V_w$ (Eq. 3) as follows:

$$S_w(\varepsilon_r) = \frac{V_w}{\phi} \qquad \text{Eqn. (5)}$$

Equations 5 and 4a and/or 4b provide a model for permittivity-based formation water saturation $S_w(\varepsilon r)$ as a function of relative dielectric permittivity $\varepsilon_r$ which is referred to as a "Deep Reading Relative Permittivity model" or "DRRP model" herein.

Figure 5:
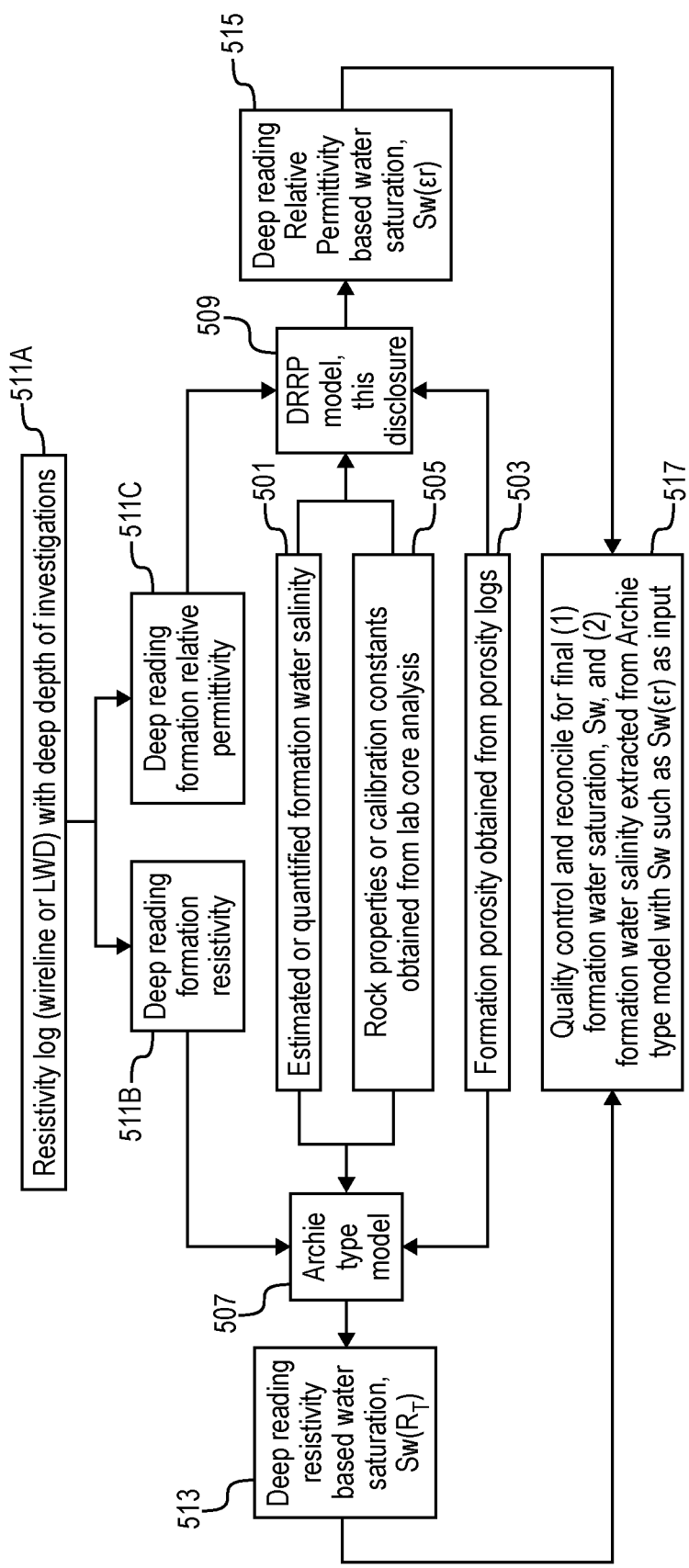
FIG. 5 is a flowchart illustrating an example workflow of determining formation water saturation (1) using relative dielectric permittivity data extracted from deep reading electromagnetic measurements, (2) using resistivity data extracted from deep reading electromagnetic measurements, and (3) integrating between relative permittivity based saturation and resistivity based saturation for formation saturation.

FIG. 5 is a flowchart illustrating an example workflow of determining formation water saturation using relative dielectric permittivity data extracted from deep reading electromagnetic measurements. In addition, an integrated and reconciled formation water saturation and formation water salinity can also be determined by using both the conductivity and relative permittivity data extracted from one or more induction logs by following the operations of the workflow.

The workflow begins in block 501 which determines or quantifies an initial estimate of formation water salinity, which can be obtained from field testing or lab measurements of formation water samples.

In block 503, formation porosity can be determined independently from the estimate of formation water salinity of block 501. For example, formation porosity can be determined from porosity logging operations by acoustic, nuclear (e.g., combination of density and neutron), NMR or other suitable porosity logging operations. The formation porosity of block 503 can be used as input to the Archie-type model (block 507) and the DRRP model (block 509).

In block 505, rock properties or other calibration constants that are used as inputs to the Archie-type model (block 507) and the DRRP model (block 509) are obtained, for example from laboratory core analysis or other suitable methods.

In blocks 511A, 511B and 511C, deep reading electromagnetic log measurements are obtained and processed to extract formation conductivity (and/or resistivity) and formation relative permittivity. The electromagnetic log measurements can be obtained by operation of a low frequency (few tens KHz) induction logging tool (wireline or LWD) or other suitable electromagnetic logging tool (wireline or LWD) with a deep depth of investigation (>2 ft). The formation contains porous media (reservoir rock). Formation fluids, such as connate water, oil, and/or hydrocarbon gas, can be contained within the porous media (reservoir rock). The processing of blocks 511B and 511C can involve pixel inversion-based processing to simultaneous determine the conductivity $\sigma^R$ (or resistivity) and relative permittivity $\varepsilon_r$ of the formation based on the measured R- and X-components of resistivity logs obtained from induction-type logging tools (or based on measured phase shift and attenuation data from Logging While Drilling (LWD) tools) as described above. In other embodiments, model-based inversion processing can also possibly be used.

In block 513, the Archie-type model (block 507) is used to determine a resistivity-based formation water saturation, $S_w(R_T)$. For example, the Archie-type model of block 507 can be a formation resistivity-based Archie model, such as the model of Eqn. (1) described above where the formation water saturation $S_w$ is determined as function of true formation resistivity $R_T$ as determined in block 511B.

In block 515, the DRRP model (block 509) is used to determine a permittivity-based formation water saturation, $S_w(\varepsilon_r)$. For example, the DRRP model of block 507 can be a permittivity-based model, such as the model of Eqns. (5) and 4(a) and/or 4(b) described above where the formation water saturation $S_w$ is determined as function of relative dielectric permittivity $\varepsilon_r$ as determined in block 511C.

In block 517, the resistivity-based formation water saturation $S_w(R_T)$ of block 513 and the permittivity-based formation water saturation $S_w(\varepsilon r)$ of block 515 are integrated and/or reconciled with one another to determine a final formation water saturation $S_w$ based thereon. As part of the reconciliation to determine the final formation water saturation $S_w$, in a high salinity environment, the final formation water saturation $S_w$ can be equated to $S_w(R_T)$, or more weight may be given to $S_w(R_T)$ relative to $S_w(\varepsilon r)$. On the other hand, in a freshwater (low salinity) environment or in an unknown or mixed salinity environment, the final formation water saturation $S_w$ can be equated to $S_w(\varepsilon r)$ or more weight may be given to $S_w(\varepsilon r)$ relative to $S_w(R_T)$. The weighting factor is a function of water salinity.

The final formation water saturation $S_w$ as determined in block 517 can be used to determine useful formation properties, such as hydrocarbon saturation, original oil in place (i.e., stock-tank original oil in place) and/or volume of original gas in place formation. In another example shown in Eqn. (6) below, by substituting $S_w(R_T)$ with $S_w(\varepsilon r)$ in the Archie-type model (e.g., Eqn. (1)), formation water salinity at a given temperature may also be determined as of block 517. This calculation is useful in unknown mixed salinity environments and estimated qualitatively in freshwater environments.

$$R_W = S_w{}^n(\varepsilon_r)\phi^m R_T. \qquad \text{Eqn. (6)}$$

In other embodiments, the final formation water saturation $S_w$ as determined in block 517 can be used for formation evaluation and saturation monitoring, such as identifying by-passed hydrocarbon, monitoring water movement, evaluating water sweep efficiency, identifying an invasion profile in fresh water or mixed salinity environments, identifying fluid and core sampling depths in fresh water or mixed salinity environments, or identifying completion perforation locations in fresh water or mixed salinity environments. For example, completion perforation locations that would interface to parts of the formation that are invaded by relatively high amount of water (as determined from the final formation water saturation $S_w$) can be avoided, while completion perforation locations that interface to parts of the formation that include a relatively high amount of hydrocarbons (e.g., oil or gas) can be used for completion.

In still other embodiments, the final formation water saturation $S_w$ as determined in block 517 can be used to evaluate formations through horizontal and multilateral wells where effects such as polarization horns, formation anisotropy, etc. on measured formation resistivity are significant.

It will be appreciated that the workflow as described herein can employ a downhole logging tool (such as a wireline or logging-while-drilling tool) that is conveyable in a wellbore that traverses the reservoir rock under investigation, such as the logging tool described below with respect to FIGS. 6 and 7.

Figure 6:
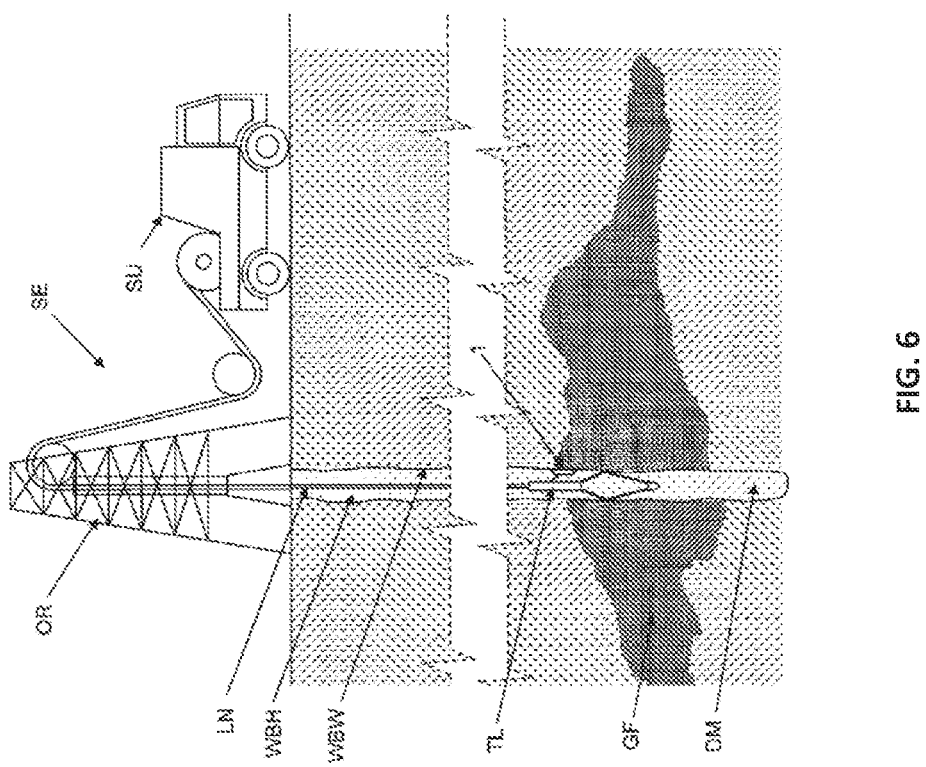
FIG. 6 is a schematic diagram illustrating an example onshore hydrocarbon well location.

FIG. 6 is a schematic diagram that illustrate an example onshore hydrocarbon well location with surface equipment SE above a hydrocarbon geological formation GF after drilling operation has been carried out. At this stage, i.e. before a casing string is run and before cementing operations are carried out, the wellbore WBH filled with a fluid mixture DM, which is typically a mixture of drilling fluid and drilling mud. In this example, the surface equipment SE comprises an oil rig OR and a surface unit SU for deploying a logging tool TL in the wellbore WB. The surface unit may be a vehicle coupled to the logging tool by a wireline cable LN. Further, the surface unit comprises an appropriate device for determining the depth position of the logging tool TL relative to the surface level. The logging tool TL may comprise a centralizer that is configured to insure a correct axial positioning of the logging tool in the wellbore WBH. The logging tool TL comprises various tools or sensors and provides various measurement data related to the hydrocarbon geological formation GF and/or the fluid mixture DM. These measurement data are collected by the logging tool TL and transmitted to the surface unit SU. The surface unit SU comprises appropriate electronic and software arrangements for processing, analyzing and storing the measurement data provided by the logging tool TL.

It should be appreciated that in an alternative embodiment such processing circuitry is capable of being located downhole in or near the logging tool TL itself. Such processing circuitry being capable of handling all the processing functionality pertaining to the various measurements and models described herein.

Figure 7:
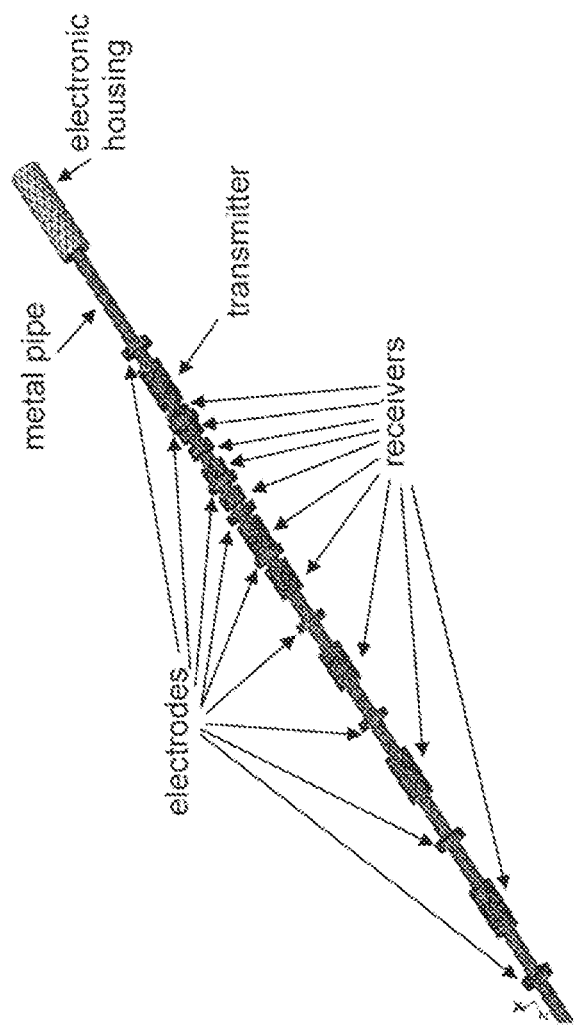
FIG. 7 is schematic diagram of an induction logging tool.

Moreover, while FIG. 7 shows a wireline application, it should also be appreciated that the embodiments described herein are equally applicable to logging while drilling applications. That is, there is no need for the logging tool to be limited to an application wherein it is attached to a separate wire or cable controlling its movements, it is possible for the different functionality of the logging tool to be incorporated into the actual drill pipe itself (for example on the drill collar). This advantageously allows the benefits of the improved techniques described herein to be used during the drilling stage as well, such as for geosteering the drill bit to adjust and control the trajectory or path of drilled wellbore based on log measurements and data of the workflow obtained from different depths and different azimuth directions as described herein.

FIG. 7 is a schematic diagram of an induction logging tool that can be included as part of the logging tool TL and configured to perform the induction measurement as part of the workflow described herein in order to investigate the geological formation GF traversed by the wellbore WBH. The induction logging tool includes a metal pipe inside an insulating mandrel which supports mutually orthogonal and collocated transmitter and receiver coils. The tool includes a transmitter with three transmitter coils along with several receivers spaced therefrom. The three transmitter coils are energized by an alternating current. The oscillating magnetic field produced by this arrangement results in the induction of currents in the formations which are nearly proportional to the conductivity of the formations. These currents flow orthogonal to the planes oriented with respect to respective transmitter normals in the X, Y and Z directions, which are defined by the directions of the dipole moments of each of the three transmitter coils. These currents contribute to the voltage induced in one or more of the receiver coils. The X and R signal components of such voltage signals can be obtained and converted into digital form as X and R signal component data. Such multi-component signal data can be interpreted by inversion processing to determine a log of formation resistivity (or conductivity) and permittivity (or dielectric constant) as well as other useful petrophysical parameters, such as anisotropy, relative dip angles, strike angles, sand and shale content and water saturation. The electrodes coupled the metal pipe to the exterior of the tool and the borehole fluid. These electrodes are positioned above and below the transmitter and receiver antennas as well as in-between the antennas, and function to compensate for tool eccentricity. The electronics housing can include a signal generator and power amplifiers (not shown) to cause alternating currents of selected frequencies to flow through transmitter coils. A processor which controls the operation of the tool and processing acquired data may be part of the electronics housing. The electronics housing can also include communication equipment for communicating the X and R signal component data to a surface processor for follow-on processing as part of the workflow. Alternatively, some or all of the processing and control may be done by the surface processor.

In other embodiments, the induction logging tool can be an array induction logging tool, such as the AIT or Thrubit Induction tools of Schlumberger Technology Corporation. In still other embodiments, the workflow can be based on attenuation and phase shift measurements acquired by a propagation-type downhole tool as a substitute for the R and X signals acquired by the induction logging tool.

Note that the downhole measurement of the workflow can be performed at different depths and different azimuth directions in the wellbore in order to investigate different parts of the geological formation that is traversed by the wellbore, and the processing of the workflow can be repeated for the corresponding downhole measurements at the respective depths and azimuth directions in order to accurately measure water saturation or other formation parameters at the measured depths and azimuthal directions. Such analysis is particularly useful for formations in freshwater and/or unknown mixed salinity environments.

Figure 8:
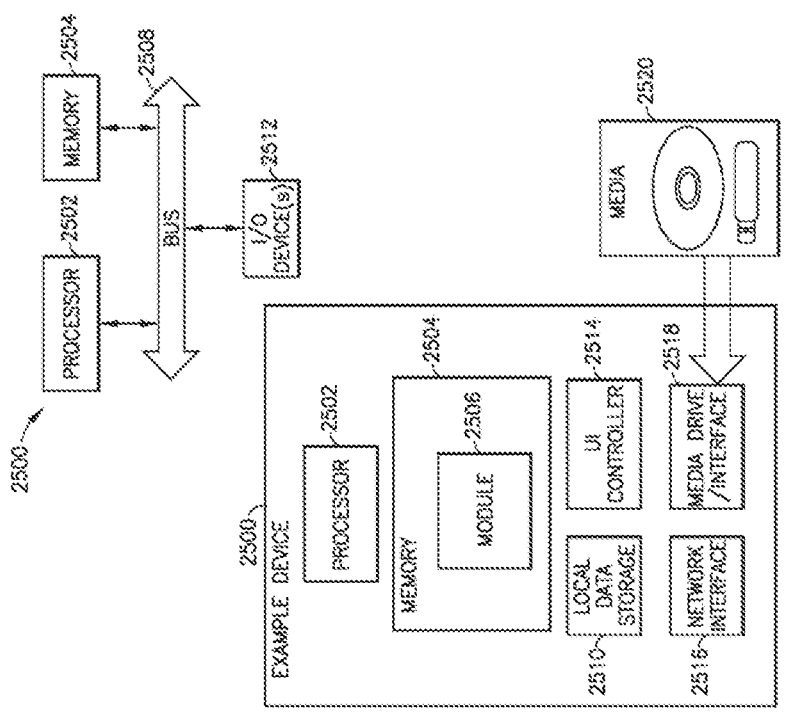
FIG. 8 is a schematic diagram of a computer system.

FIG. 8 illustrates an example device 2500, with a processor 2502 and memory 2504 that can be configured to implement various embodiments of the workflow described herein. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518. Various processes of the present disclosure or parts thereof can be implemented by instructions and/or software programs that are elements of module 2506. Such instructions and/or software programs may reside on removable media 2520 readable by media drive/interface 2518 as is well known in the computing arts.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes or parts of the workflow of the present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

In embodiments, any one or any portion or all of the steps or operations of the workflow as described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. Moreover, embodiments described herein may be practiced in the absence of any element that is not specifically disclosed herein.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

There have been described and illustrated herein one or more embodiments of methods and systems that extract deep formation conductivity (or resistivity) and formation relative permittivity from electromagnetic log measurements and process the deep formation conductivity (or resistivity) and formation relative permittivity to determine water saturation of formation rock and possibly other useful formation parameters and fluids parameters, such as reservoir wettability. It will therefore be appreciated by those skilled in the art that yet other modifications could be made to the provided invention without deviating from its spirit and scope as claimed.

What is claimed is:

1. A method of characterizing a geological formation comprising:
   receiving, via a processing system, electrical signal data from a downhole logging tool, wherein the electrical signal data corresponds to an interaction between one or more electrical signals generated by the downhole logging tool and the geological formation;
   processing, via the processing system, the electrical signal data to determine a first dataset characterizing a relative permittivity and a conductivity of the geological formation;
   providing, via the processing system, the first dataset characterizing the relative permittivity and the conductivity of the geological formation as an input to at least one model to determine a second dataset characterizing a water saturation of the geological formation, wherein the at least one model is based on a first equation, a second equation, and a third equation, wherein the first equation comprises a relationship between the relative permittivity of the geological formation and a water volume of the geological formation, wherein the second equation comprises a relationship between the water volume of the geological formation, a porosity of the geological formation, and a permittivity-based water saturation of the geological formation, and wherein the third equation comprises an Archie equation comprising a relationship between the conductivity of the geological formation and the water saturation of the geological formation;
   determining, via the processing system, one or more adjustments to a trajectory of the downhole logging tool while positioned within a borehole based on the second dataset; and
   sending, via the processing system, one or more commands to the downhole logging tool to adjust the trajectory, wherein the downhole logging tool is configured to modify the trajectory in response to receiving the one or more commands.

2. The method of claim 1, wherein:
   the first equation is of the form
   $$V_w = A\varepsilon_r + B,$$
   where $\varepsilon_r$ represents the relative permittivity of the geological formation, $V_w$ represents the water volume of the geological formation, and A and B are calibration constants.

3. The method of claim 1, wherein:
   the first equation is of the form $V_w^2 + aV_w = b\varepsilon_r + c$, where $\varepsilon_r$ is the parameter represents the relative permittivity of the geological formation, $V_w$ represents the water volume of the geological formation, and a, b, and c are calibration constants.

4. The method of claim 1, wherein:
   the second equation is of the form
   $$S_w(\varepsilon_r) = \frac{V_w}{\phi},$$
   where $S_w(\varepsilon_r)$ represents the permittivity-based water saturation of the geological formation, $V_w$ represents the water volume of the geological formation, and $\phi$ represents the porosity of the geological formation.

5. The method of claim 1, wherein:
   the geological formation is a freshwater environment or a mixed salinity environment.

6. The method of claim 1, wherein:
   the at least one model includes an additional equation that comprises a relationship between a resistivity of the geological formation or the conductivity of the geological formation to a resistivity-based water saturation of the geological formation.

7. The method of claim 6, wherein:
   the permittivity-based water saturation of the geological formation is combined or reconciled with the resistivity-based water saturation of the geological formation to generate the second dataset.

8. The method of claim 6, wherein:
   in a high salinity environment, the second dataset is equated to the resistivity-based water saturation of the geological formation, or more weight is given to the resistivity-based water saturation of the geological formation relative to the permittivity-based water saturation of the geological formation in generating the second dataset.

9. The method of claim 6, wherein:
   in a freshwater environment, or an unknown salinity environment, or a mixed salinity environment, the second dataset is equated to the permittivity-based water saturation of the geological formation, or more weight is given to the permittivity-based water saturation of the geological formation relative to the resistivity-based water saturation of the geological formation in generating the second dataset.

10. The method of claim 6, wherein:
    the additional equation is of the form
    $$S_w^n = \frac{R_w}{R_T} \frac{1}{\phi^m},$$
    where $S_w$ is the resistivity-based water saturation of the formation, $R_w$ is a formation water resistivity which is a function of water salinity and measurement temperature, $R_T$ is a true formation resistivity, $\phi$ is the porosity of the geological formation, and m and n are formation rock electrical properties.

11. The method of claim 1, wherein:
    the first dataset is determined based on inverting the electrical signal data to determine the relative permittivity of the geological formation.

12. The method of claim 11, wherein:
    the electronic signal data is inverted based on a pixel-based inversion process.

13. The method of claim 11, wherein the electronical signal data is inverted based on a cost function comprising a misfit term, an entropy term, and a smoothing term.

14. The method of claim 11, wherein the electronical signal data is inverted based on a Maxwell equation comprising the relative permittivity and the conductivity of the geological formation.

15. The method of claim 1, wherein:
    the downhole logging tool comprises an induction tool, and wherein the electrical signal data comprises in-phase signal component data and out-of-phase signal component data.

16. The method of claim 1, wherein:
    the downhole logging tool comprises a propagation logging tool, and wherein the electrical signal data comprises attenuation signal component data and phase-shift signal component data.

17. The method of claim 1, wherein the borehole comprises a horizontal well or a multilateral well.

18. The method of claim 1, comprising:
receiving, via the processing system, additional electrical signal data from the downhole logging tool; and
providing, via the processing system, the additional electrical signal data to the at least one model to update the second dataset.

19. The method of claim 18, comprising:
monitoring the updated second dataset for an indication of a reservoir of by-passed hydrocarbons, a water movement, a water sweep efficiency, an invasion profile in a fresh water environment or a mixed salinity environment, a fluid and core sampling depth, a completion perforation location, or any combination thereof.

20. The method of claim 1, wherein the electrical signal data is received via a wireline cable connected to the downhole logging tool.

\* \* \* \* \*